United States Patent [19]
Unno

[11] 3,726,573
[45] Apr. 10, 1973

[54] HIGH RIGIDITY FLUID BEARINGS

[75] Inventor: Kunihiko Unno, Kariya, Japan

[73] Assignee: Toyoda Koki Kabushiki Kaisha, Kariya-shi, Aichi-ken, Japan

[22] Filed: Apr. 7, 1971

[21] Appl. No.: 132,130

[30] Foreign Application Priority Data

Apr. 21, 1970 Japan..........................45/34077

[52] U.S. Cl.....................................................308/9
[51] Int. Cl.................................................F16c 17/16
[58] Field of Search..........................308/9, 9 A, 122, 308/121

[56] References Cited

UNITED STATES PATENTS 3,454,311  7/1969  Tomita et al. ........................308/122

Primary Examiner—Martin P. Schwadron
Assistant Examiner—Frank Susko
Attorney—Wenderoth, Lind & Ponack

[57] ABSTRACT

In a high rigidity fluid bearing of the type wherein a rotating shaft is supported by fluid under pressure contained in fluid pockets formed in the bearing surface in spaced apart relationship in the circumferential direction and surrounded by raised lands, the axial width of the lands is made narrower on the load side than on the no load side so as to cause more pressurized fluid to flow out from the pockets over the load side lands than over the no load side lands.

5 Claims, 6 Drawing Figures

HIGH RIGIDITY FLUID BEARINGS

BACKGROUND OF THE INVENTION

This invention relates to an improved high rigidity fluid bearing used for the spindle of a machine tool or the like.

When compared with sliding type bearings, a fluid bearing utilizing the hydrostatic pressure of a pressurized fluid is advantageous in that there is no metal-to-metal contact between the shaft and the bearing metal and that the shaft can rotate stably at high speed because the shaft is floated and supported by a fluid film is a larger gap.

More particularly, as shown in FIGS. 1 to 3, in a typical prior art fluid bearing, a plurality of fluid pockets or cavities $3a$ to $3d$, equally spaced apart in the circumferential directions, are formed in the bearing surface 2 of the bearing metal 1, and fluid under pressure is admitted into these pockets through throttles $4a$ to $4d$. The pressurized fluid in pockets $3a$ to $3d$ flows out from the pockets through gaps or clearances between the bearing surface 2 and shaft 5 into exhaust grooves $7a$ to $7d$ intermediate adjacent pockets and is then discharged into a reservoir, not shown, through circumferential grooves $8a$ and $8b$ communicated with the opposite ends of exhaust grooves.

Considering now pocket $3a$, for example, this pocket is surrounded by grooves $7a$, $7d$ and $8a$, $8b$, and a rectangular raised land $2a$ is formed between the pocket and the grooves at which the clearance between the shaft and the bearing surface 2 is small, as shown in FIG. 3. The inner surface of the land $2a$ is an arcuate surface encircling the outer periphery of the shaft with a small clearance or gap and the pressurized fluid flows out of the pocket $3a$ is all directions, as shown by arrows in FIG. 3 into surrounding grooves $7d$, $7b$ and $8a$, $8b$ so that the distribution of the static pressure is uniform in the pocket but decreases to the atmospheric pressure toward surrounding grooves. Another pockets $3b$, $3c$ and $3d$ are provided with similar lands $2b$, $2c$ and $2d$, respectively. This, the bearing surface is formed with a plurality of spaced apart fluid pockets on cavities surrounded by lands and a plurality of exhaust grooves separate the lands. As is well known in the art, when shaft 5 is displaced radially lands $2a$ through $2d$ act to manifest resistance to the flow out of the pressurized fluid for increasing the hydrostatic pressure in the pockets on the side where the clearance between the shaft and the bearing metal 1 increases so as to establish a pressure differential between pockets in which the clearance has increased and pockets in which the clearance has decreased thereby correcting the deviation of the shaft.

However, the prior art fluid bearing of the construction described hereinabove must be considered in designing with respect to following points. More particularly, it is usual to design the land such that $l_1 = l_2$ (axial width) and $l_3 = l_4$ (circumferential width), as shown in FIG. 3. With this design, when a radial load $F_1$ is applied to the shaft on the lefthand side thereof as viewed in FIG. 2, the axis of the shaft will be inclined to increase the clearance on the upper side of the shaft from $h$ to $h_1$ on the load side whereas decrease the clearance from $h$ to $h_2$ on the no load side. However, since the displacement from $h$ to $h_2$ is very small, the variation in the flow quantity of the fluid caused by the variation in the clearances under load is the largest at the load side portions of the land having a width of $l_1$ or $l_2$. But, as $l_1 = l_2$, the flow quantity passing through the portions of the land of the thickness $l_1$ or $l_2$ under no load condition is not relatively large with reference to the total quantity. Accordingly, the variation in the bearing pressure caused by the deviation of the shaft is relatively small. Thus, it is necessary to enlarge the bearing area in order to increase the rigidity of the fluid bearing.

SUMMARY OF THE INVENTION

It is therefore an object of this invention to provide an improved high rigidity bearing which can increase the variation in the bearing pressure when the shaft is deviated or inclined thus improving the rigidity of the bearing.

According to this invention, in a high rigidity bearing adapted to rotatably support a rotary shaft subjected to a radial load and of the type including a bearing surface provided with a plurality of fluid pockets spaced apart in the circumferential direction and a plurality of raised lands respectively surrounding the pockets to define small clearances between the shaft and the bearing surface and wherein fluid under pressure is admitted into the pockets, and axial width of the lands is made narrower on the load side than on the no load side so as to cause more pressurized fluid to flow out from the pockets through the clearances on the load side lands than on the no load side lands.

According to another aspect of the invention, each one of the fluid pockets is provided with raised outlet lands in the pocket, each of the raised outlet lands defining a small clearance between it and the shaft and being provided with an outlet port for flowing out the large portion of the pressurized fluid.

DESCRIPTION OF THE PREFERRED EMBODIMENT

Figure 1:
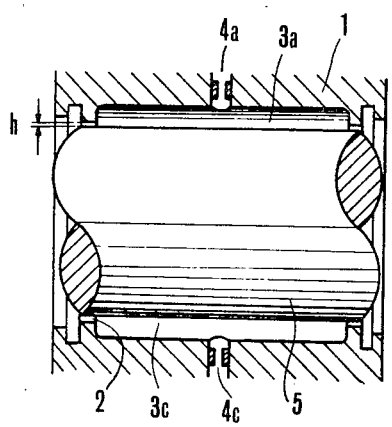
FIG. 1 shows a longitudinal section of a conventional fluid bearing under no load condition.
Figure 2:
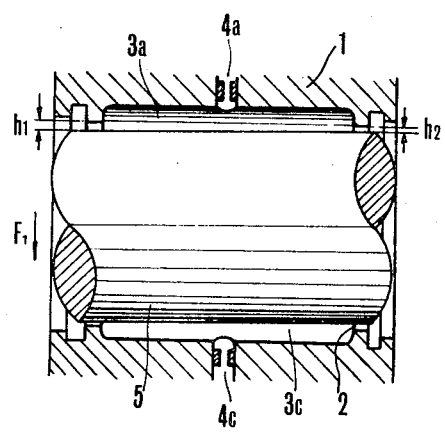
FIG. 2 shows the bearing shown in FIG. 1 under loaded condition.
Figure 3:
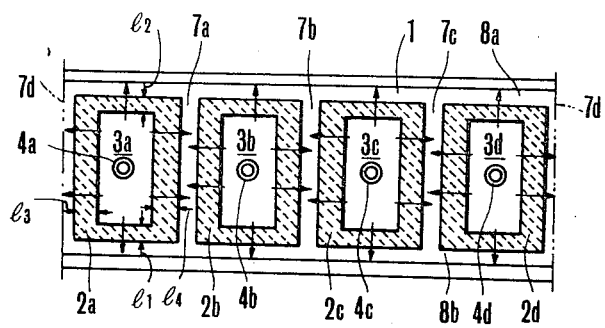
FIG. 3 shows a schematic developed view of the bearing surface of the fluid bearing shown in FIGS. 1 and 2.
Figure 4:
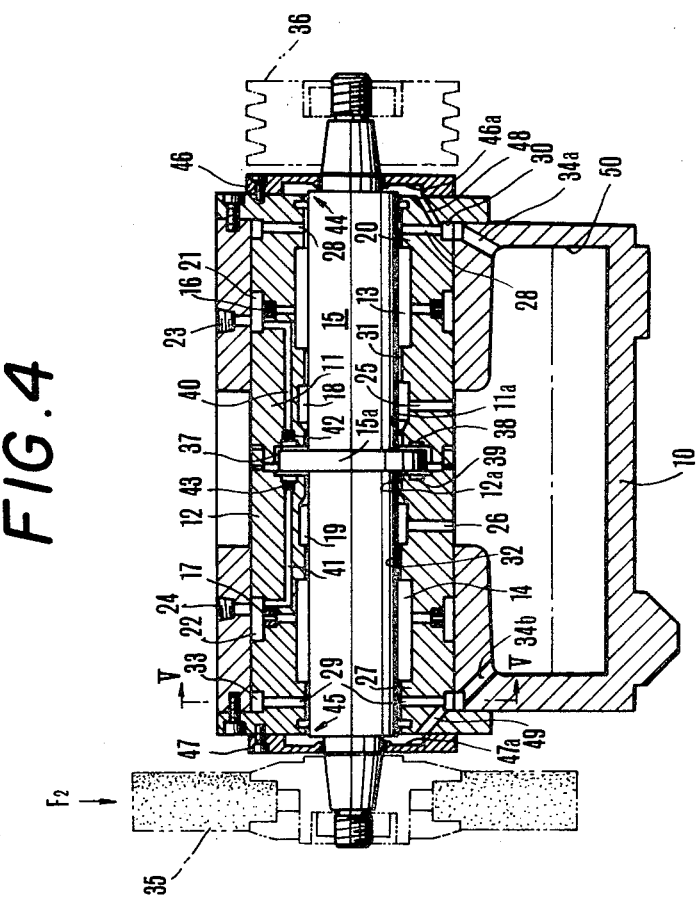
FIG. 4 shows a longitudinal section of one embodiment of this invention.
Figure 5:
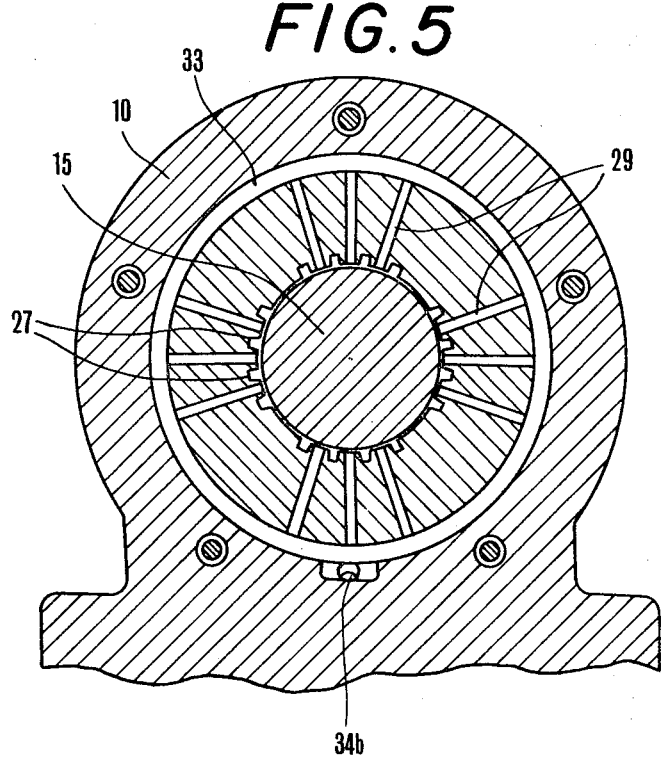
FIG. 5 shows a cross-sectional view of the bearing shown in FIG. 4 taken along line V—V and FIG. 6 is a perspective view of the bearing surface of the novel bearing.
Figure 6:
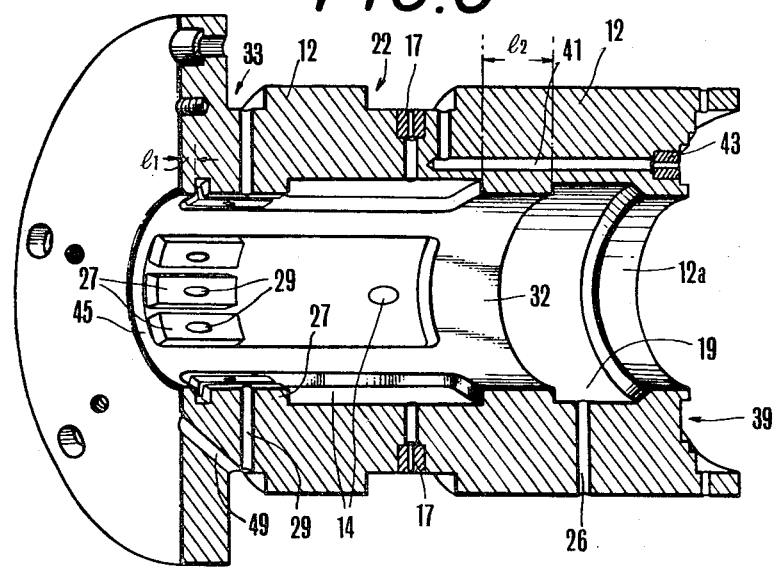

With reference now to FIGS. 4 to 6, a fluid bearing illustrated therein comprises a housing 10 and cylindrical bearing metals 11 and 12 inserted in the housing from the opposite ends, with thin end flanges secured to the opposite ends of the housing and their inner end fitted with each other. Bearing metals 11 and 12 are formed with bearing surfaces or bores $11a$ and $12a$ for receiving a shaft 15. Shaft 15 extends through bores $11a$ and $12a$ with small clearances and a grinding wheel 35 and a pulley 36, for example are mounted on the end portions of the shaft 15 on the outside of housing 10 as shown by phantom lines in FIG. 4. Between the inner ends of bearing metals 11 and 12 is interposed, with a small gap, an annular shoulder or flange 15a integrally formed with the shaft at the central portion thereof. Further, annular pockets 38 and 39 are formed in the inner end surfaces of bearing metals 11 and 12 and these pockets 38 and 39 are communicated with annular grooves 21 and 22 formed on the outer periphery of bearing metals 11 and 12 respectively through axial passages 40 and 41 and throttles 42 and 43, annular grooves 21 and 22 being communicated with pressurized fluid supply ports 23 and 24, respectively, on the upper portions of the housing 10. Although not shown in the drawing these ports 23 and 24 are supplied with incompressible fluid under pressure, for example lubricant oil from a pump via a relief valve.

As shown in FIGS. 4 and 6, the bearing surfaces 11a and 12a are provided with a plurality of fluid pockets 13 and 14, equally spaced apart in the circumferential direction which are communicated with annular grooves 21 and 22 respectively through throttle valves 16 and 17.

Furthermore, the bearing surfaces are provided with annular grooves 18 and 19 which are in communication with the outside of bearing metals 11 and 12 through exit ports 25 and 26 radially extending through bearing metals.

As shown in FIGS. 5 and 6 a plurality of spaced apart raised exit lands 20 and 27 integral with bearing metals 11 and 12, respectively, are formed on the outer or load ends of pockets 13 and 14. These lands are formed with radial outlet ports 28 and 29 at their centers, which are communicated with outer ports 34a and 34b at the bottom of the housing 10 via annular grooves 30 and 33 formed on the outer periphery of bearing metals 11 and 12. The axial width $l_1$ of the load side lands 44 and 45 on the sides opposite to the no load side lands 31 and 32 of the bearing surfaces 11a and 12a is designed to be less than ½ of the axial width $l_2$ of the no load side lands 31 and 32 as shown in FIG. 6.

Caps 46 and 47 secured to the outer ends of bearing metals 11 and 12 are formed with annular recesses 46a and 47a, respectively, and bearing metals 11 and 12 are formed with evacuating ports 48 and 49 communicating with annular recesses 46a, 47a and annular grooves 30 and 33, respectively.

With this constructions, the pressurized fluid introduced into the housing is supplied into fluid pockets 13 and 14 respectively through annular grooves 21, 22 and throttles 16, 17. Only a small portion of the fluid supplied to pocket 13 can pass through the clearances at the lands 32 and 45. The fluid passed through these lands is discharged into reservoir 50 through grooves 19 and outlet port 26 and through annular recess 47a and evacuating port 49. Major portion of the fluid in pocket 14 passes through the clearance at raised land 27 and then discharges into oil reservoir 50 through outlet port 29. In the same manner, only a small portion of the pressurized fluid supplied to pocket 14 can pass through the clearances at the lands 31 and 44 and the fluid that has passed through these clearances is discharged into reservoir 50 through groove 18 and outlet port 25 and through annular recess 46a and evacuating port 48. Remaining portion of the fluid in pocket 13 discharges into reservoir 50 trough the clearance at the load side land 20 and outlet port 28.

It will be clear that hydrostatic pressures of the intensity determined by the flow resistance of throttles 16 and 17 and of the clearances between the shaft and bearing surfaces 11a and 12a are established in pockets 13 and 14 to float shaft 15 to maintain it at the center of bearing metals 11 and 12 without touching the bearing surfaces 11a and 12a. Since the axial width of the load or outer side lands 44 and 45 is made smaller than that of the no load side lands 31 and 32, under no load or inner condition the pressurized fluid supplied to pockets 13 and 14 flows outwardly mainly through load side lands 44 and 45. Assuming now that a load $F_2$ is applied to the shaft 15 at the grinding wheel 35 as shown in FIG. 4, shaft 15 is inclined as above described to vary the clearances at load side lands 44 and 45 in greater extents than those at no load side lands 31 and 32. Since the axial width of the lands 44 and 45 on the load side is made narrower than that of the lands 31 and 32 on the no load side, this variation in the clearances results in a large variation in the flow quantity of the fluid flowing outwardly from pockets 13 and 14. Consequently, the pressure differentials before and after throttles 16 and 17 vary greatly. Moreover the flow quantity of the fluid flowing outwardly from the pockets 13 and 14 over the load side lands under no load condition is made large by the provision of exit ports 28 and 29 through outlet lands 20 and 27, the pressures in pockets 13 and 14 undergo more larger variation when shaft 15 is inclined as above described.

Thus, according to this invention the axial width of the load side land is made narrower than that of the no load side land so as to cause major proportion of the pressurized fluid in the bearing pockets to flow out over the load side land so that the variation in the bearing pressure at the time of displacement or tilting of the shaft is increased whereby the rigidity of the fluid bearing is greatly improved.

Furthermore, according to this invention, since lands having exit ports are provided in the bearing pocket only on the load side thereof the flow quantity of the pressurized fluid flowing outwardly from the pocket on the load side thereof is increased, so that the rigidity of the bearing against the inclination of the shaft can be increased.

On the contrary if the axial width of the land is decreased on the load side as well as on the no load side the consumption of the pressurized fluid will be increased which is of course uneconomical.

While the invention has been shown and described in terms of a preferred embodiment it will be clear that many changes and modifications may be made within the scope of the invention as defined in the appended claims.

What is claimed is:

1. In a high rigidity fluid bearing adapted to rotatably support a rotating shaft subject to a radial load and of the type including a bearing surface provided with a plurality of fluid pockets spaced apart in the circumferential direction and a plurality of raised lands respectively surrounding said pockets to define small clearances between said shaft and said bearing surface and wherein fluid under pressure is admitted into said pockets through throttle means, the improvement that comprises exit lands formed in said pockets on the load side only, each one of said exit lands defining a small clearance with said shaft and being provided with an outlet port for flowing out the large portion of said pressurized fluid, and the axial width of said lands formed in size so as to cause more pressurized fluid of the remainder to flow out from said pockets through said clearances on said load side lands than on said no load side lands.

2. The high rigidity fluid bearing according to claim 1 wherein the axial width of said lands is made narrower on the load side than on the no load side.

3. The high rigidity bearing according to claim 1 wherein said pressurized fluid is admitted into said fluid pockets through throttles.

4. The high rigidity bearing according to claim 1 which comprises a pair of coaxial bearing metals disposed on the opposite sides of a flange of said shaft with small clearances between the inner ends of said bearing metals and said flange, each one of said bearing metals being provided with a plurality of fluid pockets spaced apart in the circumferential direction, a plurality of raised lands surrounding said respective fluid pockets, the axial width of said lands being smaller on the load side than on the no load side of said bearing, a plurality of circumferentially spaced apart exit lands with exit ports, being provided on the load side of each fluid pocket, and another circumferential raised land on the inner end of said bearing metal near said flange.

5. The high rigidity fluid bearing according to claim 4 wherein an annular groove is provided between the no load side of said lands and said circumferential raised land and an exit port is provided on annular groove for discharging the pressurized fluid passed through the clearance between said shaft and said circumferential raised land.

* * * * *